United States Patent [19]
Grobert

[11] Patent Number: 5,317,322
[45] Date of Patent: May 31, 1994

[54] NULL PROCESSING AND BEAM STEERING RECEIVER APPARATUS AND METHOD

[75] Inventor: Paul H. Grobert, Granada Hills, Calif.

[73] Assignees: Magnavox Electronic Systems Company, Fort Wayne, Ind.

[21] Appl. No.: 83,396

[22] Filed: Jun. 28, 1993

Related U.S. Application Data

[63] Continuation of Ser. No. 817,169, Jan. 6, 1992, abandoned.

[51] Int. Cl.$^5$ ............................................. G01S 3/16
[52] U.S. Cl. ..................................... 342/378; 342/383
[58] Field of Search ................. 342/378, 380, 383, 194

[56] References Cited

U.S. PATENT DOCUMENTS

| | | | |
|---|---|---|---|
| 4,313,116 | 1/1982 | Powell et al. | 342/380 |
| 4,651,155 | 3/1987 | Baurle et al. | 342/378 |
| 4,734,701 | 3/1988 | Grobert | 342/380 |
| 4,771,289 | 9/1988 | Masak | 342/383 |
| 4,780,721 | 10/1988 | Dobson | 342/383 |

*Primary Examiner*—Gregory C. Issing
*Attorney, Agent, or Firm*—Noel F. Heal; Richard T. Seeger

[57] ABSTRACT

A system for processing modulated signals received, together with at least one interference signal, by an array of antenna elements in a communications receiver. The method of the invention includes demodulating the received signals, and processing the demodulated signals to produce an output signal that is substantially free of any interference signals, while at the same time effectively steering the antenna pattern produced by the array of elements, to move any spurious nulls in the pattern away from a source of information signals. This results in avoidance of any cycle slipping problems that might otherwise arise in receiver tracking control loops, and has the added benefit of significantly improving performance as measured by the signal-to-noise ratio.

11 Claims, 6 Drawing Sheets

NULL PROCESSING AND BEAM STEERING RECEIVER APPARATUS AND METHOD

This application is a continuation of application Ser. No. 07/817,169, filed Jan. 6, 1992 now abandoned.

BACKGROUND OF THE INVENTION

This invention relates generally to apparatus for receiving and combining together a plurality of modulated signals and, more particularly, to apparatus of this kind that controllably weights the various signals being combined so as to null out an interference signal superimposed on each received modulated signal. Null processing receivers of this general type are useful in a variety of applications, but present invention is described in this specification in the context of a Global Positioning System (GPS) receiver for processing modulated radio-frequency (rf) signals received from multiple orbiting satellites, and accurately determining the position of the receiver.

In the presence of an interference signal, referred to as a jamming signal, received from an unpredictable and usually variable direction, a multi-element receiver antenna array may be used to minimize or null the effect of the interference. Such a system is described in the present inventor's prior patent, U.S. Pat. No. 4,734,701, entitled "Null Processing Receiver Apparatus and Method," to be referred to as the prior Grobert patent.

In a system of this general type, the antenna array elements receive modulated radio-frequency (rf) signals, which are typically summed together to produce a sum signal for subsequent down-converting, demodulation and baseband processing. Prior to summation, each elemental rf signal is controllably adjusted in amplitude and phase (an adjustment referred to as complex weighting), in such a manner as to null or cancel out the interference signal. This adaptive interference cancellation is usually performed in a way that maximizes the power of the sum signal, since it is assumed that the power of the interference signal greatly exceeds that of the desired information signal.

The prior Grobert patent discloses a system for avoiding the use of complicated and often unreliable hardware for complex weighting of the antenna signals. Basically, a hardware section of the system downconverts each rf signal received by an antenna element to an intermediate frequency, demodulates the signal to remove encoded data in the form of a pseudorandom (pn) code (included in the signals transmitted from satellites in the Global Positioning System), and mixes the signal with reference quadrature (I and Q) signals, to produce pairs of analog baseband data signals: $I_1$, $Q_1$; $I_2$, $Q_2$; $I_n$, $Q_n$. Then the hardware filters these analog signals and converts them to digital form for further processing in a software section of the system. The software section generates an $I_{NULL}$ signal and a $Q_{NULL}$ signal. The $I_{NULL}$ signal is obtained by summing a primary I signal, such as $I_1$, with weighted versions of the auxiliary I signals, such as $I_2$, $I_3$, ... $I_n$. Each weighting circuit includes two multipliers and an integrator, and functions to multiply an auxiliary signal by a weighting factor generated by correlating the auxiliary signal with the summer output The $Q_{NULL}$ signal is generated in a similar fashion. The weighting circuits cooperate to cancel out the effect of a jamming signal, as explained in the prior Grobert patent, and the nulled I and Q signals are then used in tracking and detection circuitry.

The system described in the prior Grobert patent, and prior systems used for the same general purpose, produce a composite antenna pattern that presents a null region in the direction of a jamming signal source. Multiple jamming sources are handled in the same way, if the antenna array has enough elements, and the antenna pattern presents multiple nulls to the multiple jamming signal sources. Unfortunately, the resulting antenna pattern may also have spurious nulls that are directionally aligned with desired information signal sources, such as GPS satellites. Each spurious null reduces the signal energy from a signal source with which it may be aligned, and can also induce "cycle slips" in a carrier tracking phase lock loop in the receiver.

GPS receivers, as is generally well understood, include a number of synchronizing circuits, such as phase lock loops, to synchronize operation of the receiver with the incoming signals. Basically, a GPS signal consists of at least one rf carrier signal, modulated with data signals. One of the synchronizing circuits or tracking loops in the receiver is designed to lock onto the incoming carrier signal. If the incoming signal is weakened by a spurious antenna null, the carrier tracking loop may momentarily lose synchronism with the received carrier signal, and may thereby "slip" one or more cycles of the carrier. This is obviously disruptive to efficient operation of the receiver, and prevents continuous demodulation of satellite data. The present invention provides an elegant solution to this significant difficulty, and avoids associated carrier loop cycle slips.

SUMMARY OF THE INVENTION

The present invention resides in signal processing receiver apparatus, and a related method for its operation, for steering an antenna beam in the presence of a jamming signal, thereby moving any spurious nulls in the antenna pattern away from the direction of desired signal sources. As a result, cycle slips in the receiver synchronization apparatus are avoided and there is a significant improvement in the signal-to-noise ratio experienced for a received signal in the presence of a jamming signal.

In general terms, the invention performs two apparently inconsistent functions simultaneously: nulling of interference or jamming signals, and beam steering to track information signals. The nulling function is performed by weighting input contributions of multiple antenna elements to produce an antenna pattern that presents a null toward one or more jamming signal sources. The goal of nulling is to minimize the collective jamming signal contributions of the antenna elements. The goal of beam steering is to maximize the collective information signal contributions of the antenna elements. If both goals are to be met simultaneously, the method employed has to find some way to avoid nulling of the information signals, and to avoid steering the antenna array toward the jamming signals.

Briefly, the apparatus of the invention comprises demodulator means, weighting means, and summing means. The demodulator means demodulates a plurality of modulated signals received by a corresponding plurality of antenna array elements, to produce a primary information signal and one or more related auxiliary information signals, all of the information signals containing an interference signal. The weighting means operates on the one or more auxiliary information signals to produce a corresponding number of intermediate signals; and the summing means combines the primary information signal and the intermediate signals to produce a sum signal in which the interference signal is substantially nulled out. Further, the weighting means includes means for adjusting weighting factors applied to the auxiliary information signals, to steer a composite beam formed by the antenna array elements to a direction that enhances reception of the modulated signals, but without detracting significantly from the function of nulling the interference signal.

More specifically, the weighting means includes means for correlating the sum signal with each of the auxiliary information signals, to produce a corresponding number of product signals; means for integrating the product signals to produce a corresponding number of weighting factors; and means for multiplying the weighting factors by the corresponding auxiliary information signals to produce the intermediate signals for summing with the primary information signal.

To effect beam steering, the apparatus also includes means for removing any time-varying data components from the demodulated primary information signal, to leave only an essentially non-varying primary information signal; low-pass filter means, for removing from the demodulated primary information signal any components due to the interference signal; and additional summing means, for combining the primary signal, free of the interference signal, with the intermediate signals, to produce a beam steering error signal. The means for adjusting the weighting factors includes additional correlation means, for correlating the beam steering error signal with each of the auxiliary information signals to produce a second st of product signals, and means for combining the two sets of product signal to produce a single set of weighting factors.

An important aspect of the beam steering apparatus is that the means for adjusting the weighting factors further includes means for multiplying the beam steering error signal by a gain factor less than unity, for coupling to the additional correlation means. Therefore, adjustment of the weighting factors to perform the beam steering function is given less significance than selection of the weighting factors for optimum nulling performance.

In the preferred embodiment of the invention, the primary and auxiliary information signals each include an orthogonal signal pair. The apparatus components function in such a way as to process orthogonal pairs of signals, and to produce an orthogonal pair of output signals that is substantially free of interference and avoids unwanted nulling of information signals.

The weighting means is configured such that the sum signal produced by the summing means has a minimum output power, to effectively null the jamming signals, and the beam steering error signal produced by the additional summing means also has a minimum output power, to steer the antenna beam toward an information signal source. In the preferred embodiment of the invention, the primary and one or more auxiliary information signal, the one or more weighting signals, the one or more intermediate signals, and the sum signal are all baseband digital code signals.

Viewed from a slightly different standpoint, the apparatus of the invention comprises demodulator means, interference nulling means, beam steering means, and means for combining the interference nulling means and the beam steering means. As defined above, the demodulating means demodulates a plurality of modulated signals received at a corresponding plurality of antenna array elements, to produce a primary information signal and one or more related auxiliary information signals, all of the information signals containing an interference signal.

The interference nulling means combines the primary information signal with weighted components derived from the auxiliary information signals, in such a manner that an output information signal is produced substantially free of interference components. The beam steering means combines the primary information signal with weighted components derived from the auxiliary information signals, in such a manner that a composite antenna beam is steered to maximize the signal power of the received information signals. Finally, the means for combining the interference nulling means and the beam steering means gives priority to the interference nulling means. As a result the antenna array produces a pattern that has a null directed to at least one interference signal source and has no spurious nulls aligned with an information signal source.

The interference nulling means and the beam steering means both employ a common weighting means for operating on the one or more auxiliary information signals to produce a corresponding number of intermediate signals. Further, the interference nulling means has a first summing means for combining the primary information signal and the intermediate signals, to produce a first sum signal in which the interference signal is substantially nulled out. The beam steering means has a second summing means for combining the primary information signal, filtered to remove interference and data components, and the intermediate signals, to produce a second sum signal indicative of beam steering error. The weighting means includes means for correlating the auxiliary information signals with the first sum signal to produce a first set of product signals, and means for correlating the auxiliary information signals with a selected fraction of the second sum signal to produce a second set of product signals. In the preferred embodiment of the invention, the means for combining the interference nulling means and the beam steering means includes integrator means for combining the first and second sets of products to produce a single set of weighting factors for application to the auxiliary information signals.

To avoid nulling the information signals, the interference nulling means includes means for distinguishing between interference signals and information signals. More specifically, in the embodiment illustrated the means for distinguishing between interference signals and information signals includes one or more capacitive components that present a low impedance path to high-frequency interference signals and a high impedance path to low-frequency information signals.

Likewise, the beam steering means ideally includes means for distinguishing between information signals and interference signals. In the embodiment illustrated, this includes a low-pass filter to remove substantially all components of the interference signal, and means for removing low-frequency data signals encoded onto the primary information signal, to produce an information signal that is able to pass through the low-pass filter.

In terms of a novel method, the invention comprises the steps of receiving modulated signals and at least one interference signal in an array of antenna elements; demodulating a plurality of modulated signals received by the antenna elements, to produce a primary information signal and one or more related auxiliary information signals, all of the information signals containing an interference signal; weighting the one or more auxiliary information signals to produce one or more intermediate signals; and summing together the primary information signal and the one or more intermediate signals to produce a sum signal in which the interference signal is substantially nulled out. The step of weighting the auxiliary information signals includes generating a set of weighting factors that will result in nulling of the interference signal, and adjusting the weighting factors to avoid any unwanted nulling of one or more of the information signals.

More specifically, the step of weighting the auxiliary information signals includes correlating the sum signal with the one or more auxiliary information signals to produce a set of product signals; integrating each of the set of product signals to produce a set the weighting factors; and multiplying the one or more auxiliary information signals by corresponding weighting factors to obtain the intermediate signals. The step of adjusting the weighting factors includes deriving a modified primary information signal that is substantially free of interference and data modulation; combining the modified primary information signal with the intermediate signals, to produce a beam steering error signal indicative of the degree to which a composite antenna beam is being steered toward a source of the information signals; correlating a selected fraction of the beam steering error signal with the one or more auxiliary information signals to produce a second set of product signals; and combining the two sets of product signals to produce a single set of weighting factors that results in nulling of the interference signal and steering of the composite antenna beam to avoid alignment of a spurious null with a source of the information signals.

In the preferred embodiment of the invention, the primary and auxiliary information signals each include an orthogonal signal pair. Each of the steps in the method encompass processing orthogonal pairs of signals, to produce an orthogonal pair of output signals that is substantially free of interference and avoids unwanted nulling of information signals.

It will be appreciated from the foregoing that the present invention is a significant advance in the field of signal processing receivers. In particular, the invention provides an interference nulling function in combination with a selected degree of beam steering to maximize the power of received information signals. Other aspects and advantages of the invention will become apparent from the following more detailed description, taken in conjunction with the accompanying drawings.

DESCRIPTION OF THE PREFERRED EMBODIMENT

Figure 1:
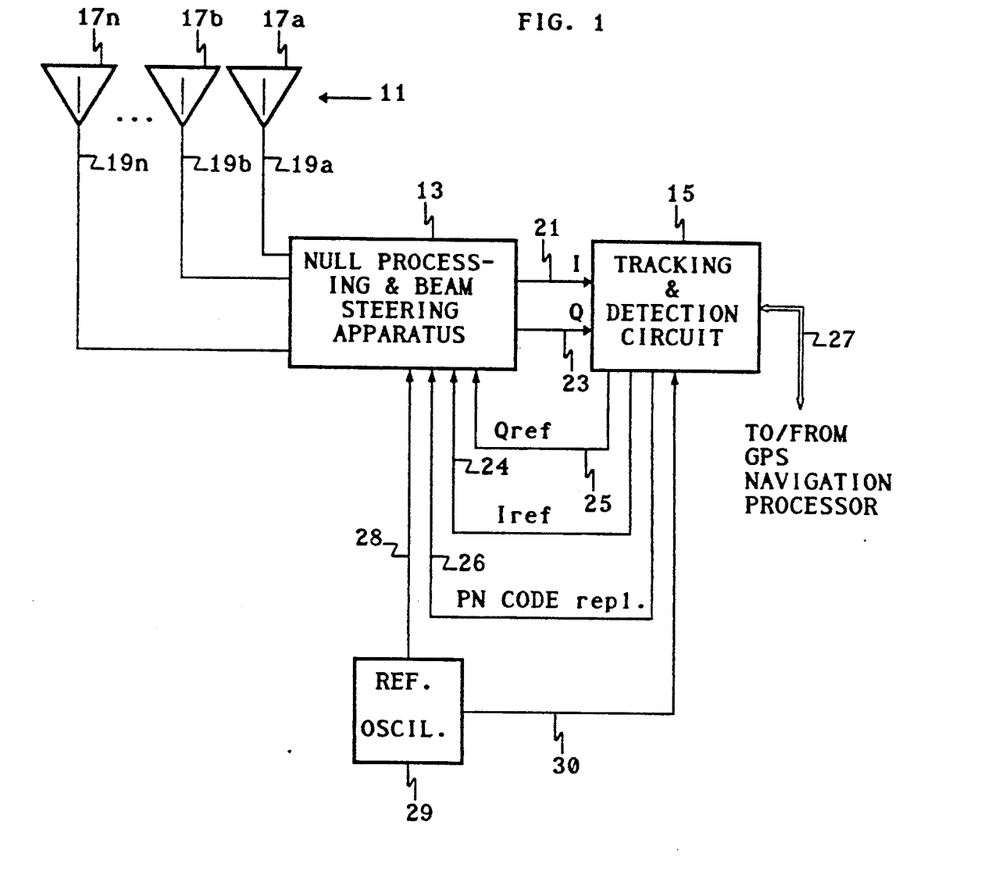
FIG. 1 is a simplified block diagram of a Global Positioning System (GPS) receiver, which includes null processing and beam steering apparatus embodying the present invention.

As shown in the drawings for purposes of illustration, the present invention is concerned with a technique for nulling interference or jamming signals received with data signals at an antenna array. FIG. 1 shows a portion of a Global Positioning System (GPS) that receives a number of modulated rf signals from an antenna array 11 and detects one or more binary codes originally transmitted from a corresponding number of orbiting satellites. The detected codes are supplied to a GPS navigation processor (not shown), which processes the codes to determine the precise location of the receiver. The modulated signals received from the antenna array 11 can sometimes contain interference in the form of a jamming signal. Null processing and beam steering apparatus 13, embodying the present invention, and a conventional tracking and detection circuit 15, process the modulated signals and substantially eliminate the effects of the interference.

As shown in FIG. 1, the antenna array 11 includes n elements, designated $17a$-$17n$. The modulated antenna signals are supplied on lines $19a$-$19n$ to the null processing and beam steering apparatus 13, which produces quadrature I and Q data signals on lines 21 and 23, respectively, for input to the tracking and detection circuit 15. The latter circuit generates reference signals $I_{REF}$ and $Q_{REF}$ on lines 24 and 25 for use in demodulation in the apparatus 13, and also generates a replica of the pseudorandom number (pn code) on line 26 for use in the apparatus 13. As is well known, when phase lock closure is achieved by the tracking and detection circuit 15, no satellite signal component is present in the Q channel output of apparatus 13. The circuit 15, which is of conventional design, extracts certain information from the I and Q data signals, and supplies this information to the GPS navigation processor, as indicated by data path 27. The apparatus 13 receives clock signals over line 28 from a reference oscillator 29, which also supplies clock signals to the tracking and detection circuit 15, on line 30.

The prior Grobert patent (U.S. Pat. No. 4,734,701) discloses a simplified technique for null processing, without the need for complex weighting adjustment of the received antenna signals prior to summation. Basically, this technique effects weighting after demodulation and conversion of the signals to digital form. Although the technique results in nulling of any jamming signals, it may also result in the generation of one or spurious nulls in the antenna pattern, which adversely affect operation of the receiver if a spurious null is directionally aligned with an information signal source, such as a GPS satellite.

In accordance with the present invention, nulling of a jamming signal is effected in a manner similar to that of the prior Grobert patent, but the effects of spurious nulls are practically eliminated by providing for steering of the antenna beam to move a spurious null away from a signal source of interest. Basically, the object of the invention is achieved by combining two circuits: the nulling circuit of the prior Grobert patent and an antenna beam steering circuit. Although antenna beam steering using an array of antenna elements is a relatively simple matter in the absence of jamming signals, it is not immediately obvious how one might effect antenna beam steering in the presence of jamming, and concurrently with operation of the nulling circuit.

To facilitate an explanation of the invention, the nulling and beam steering functions will be described separately, using separate block diagrams; then the combined functions will be described using a single block diagram. Throughout this description, it will be understood that numerous references to "circuits," "mixers," "integrators," "summers," "filters" and the like should not be taken to mean that there are separate hardware components for performing these functions. As in the earlier Grobert patent, the preferred mode of implementation is software, using a programmed microprocessor or similar component for performing the various functions on digital forms of the input signals. As in the prior patent, the elemental functions being performed by the software are relatively simple, and it will be readily understood by anyone of ordinary skill in the programming and signal processing arts how to implement the various functions in software form. For purposes of explanation, however, it is expedient to describe each component as if it were a discrete piece of hardware.

The Basic Nulling Circuit

Figure 2A:
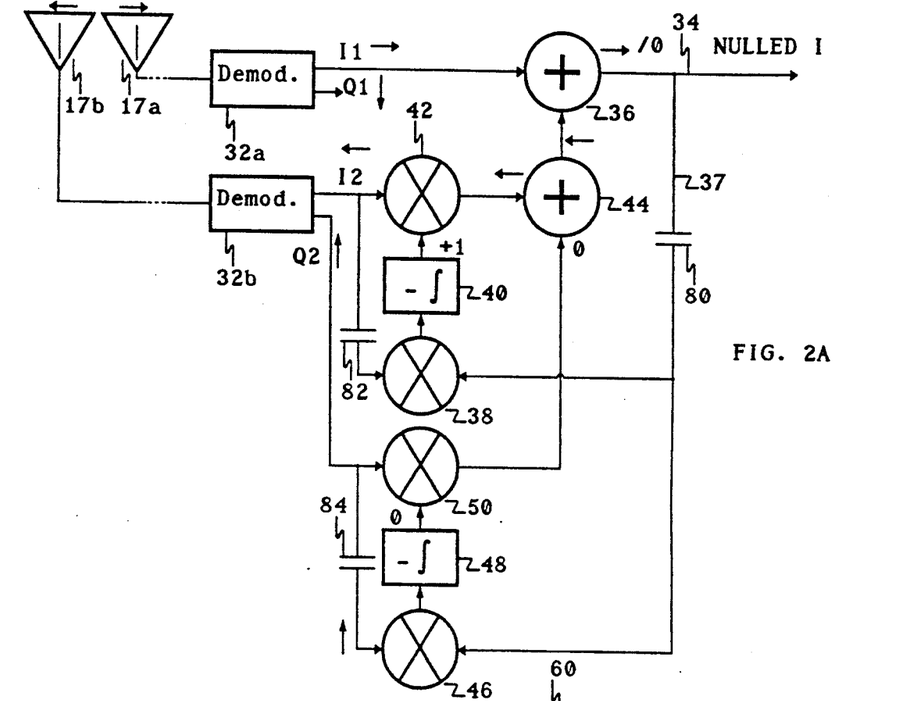
FIGS. 2A and 2B together constitute a simplified block diagram illustrating the nulling principle of the invention.
Figure 2B:
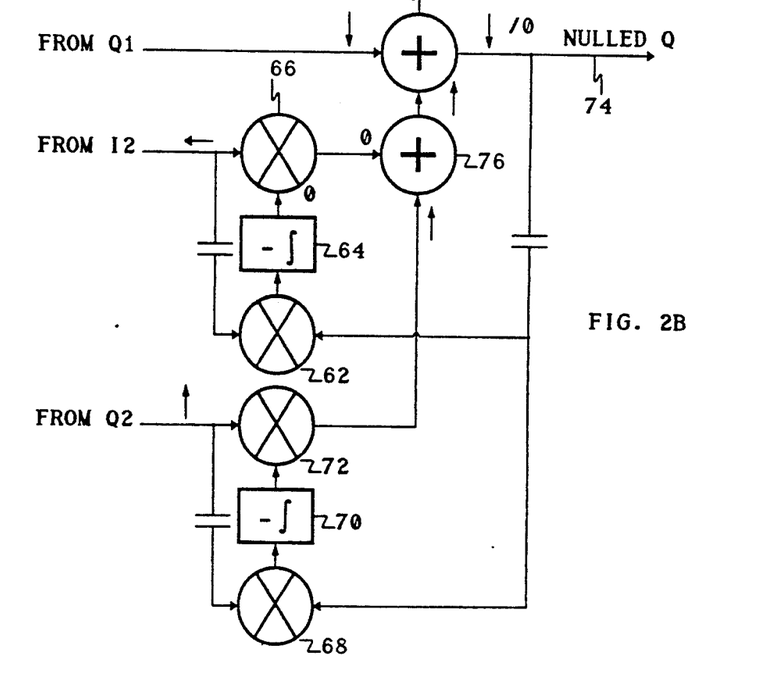

FIGS. 2A and 2B together show how a jamming signal is nulled in accordance with the invention, and further depicts how ac (alternating current) coupling is used to avoid nulling the information signals as well as the jamming signal. For convenience of illustration, only two antennas and associated processing apparatus are shown: a primary antenna element, referred to with the suffix "1" and an auxiliary antenna element, referred to with the suffix "2". Thus the quadrature signals derived from the primary antenna element 17a are referred to as $I_1$ and $Q_1$, and the corresponding signals derived from auxiliary antenna element 17b are referred to as $I_2$ and $Q_2$. Where identical or similar components are used in processing the primary and auxiliary signals, they are referred to by the same reference numeral, but using suffixes "a" and "b," respectively.

The first step in processing the received rf signals is performed in demodulators 32a and 32b. It will be understood that the demodulation step encompasses everything performed in the "hardware" section of the circuit disclosed in the prior Grobert patent, including downconverting, removing pn code from the modulate rf signals, and mixing the signals with reference I and Q signals fed back from the tracking and detection circuit 15 (FIG. 1). For purposes of this specification, the "demodulation" step performed in blocks 32a and 32b also includes low-pass filtering the signals to include only an approximately 1-kHz bandwidth, and converting the analog signals to digital form. Thus the $I_1$ and $Q_1$ signals output from the demodulator 32a are filtered digital baseband signals, as are the $I_2$ and $Q_2$ signals output from the demodulator 32b.

The circuit of FIG. 2A produces a nulled I output signal on line 34 from the input signals $I_1$, $I_2$ and $Q_2$. Basically the nulled I output signal is obtained by summing, in summer 36, the $I_1$ signal and a weighted contribution derived from the $I_2$ and $Q_2$ input signals. The nulled I output signal on line 34 is fed back over line 37 and correlated with the $I_2$ and $Q_2$ signals to produce the weighted auxiliary contribution. An $I_2$ weighting circuit comprises a mixer 38, a negative integrator 40 and a multiplier 42. The mixer 38 produces an output product signal for input to the negative integrator 40, the output of which is in turn fed to the multiplier 42. Also input to the multiplier 42 is the $I_2$ signal. The output of the multiplier 42 is connected to one input of another summer 44. The other input to summer 44 is derived from another weighting circuit, comprising a mixer 46, a negative integrator 48 and a multiplier 50. This circuit correlates the 35 nulled I output signal with the $Q_2$ input signal and produces the required input to summer 44. The output of summer 44 is connected as a second input to summer 36, which generates the nulled I output.

Operation of the nulling circuit of FIG. 2A can be best understood by considering the relative phases of signals at various points in the circuit. Although a jamming signal will in general be felt as a broadband noise-like signal, it is helpful for purposes of analysis to consider a single sinusoidal component of the jamming signal. For example, if the jamming signal reaches the antenna 17b first, and the antenna 17a is spaced one half-wavelength from antenna 17b, the signals $I_1$ and $I_2$ can be represented as oppositely directed vectors, as indicated at the demodulator outputs. For $Q_2$ the signal is represented by a vector that leads the $I_2$ vector by 90°. Initially, the outputs of the multipliers 42 and 50 will be zero and the $I_1$ signal will appear on the nulled I output line 34. When this signal is fed back and correlated with the $I_2$ input, in mixer 38, the mixer will produce a negative output and the associated negative integrator 40 will begin to ramp to a positive value. Thus multiplier 42 will begin to produce an output with the same phase as $I_2$, which will tend to cancel the $I_1$ signal in summer 36, as indicated by "/0" . adjacent to line 34. At the same time the $I_1$-phased signal on line 34 will not correlate with the $Q_2$ signal, since the two signals are orthogonal, and integrator 48 will stay at its zero level. After a time, negative integrator 40 will reach a level at which the contribution from $I_2$ will completely cancel the $I_1$ signal in summer 36, and the jammer component on output line 34 will be zero, i.e. completely nulled out. At this point there will be no correlation, in mixer 38, between the signal on line 34 and the $I_2$ input signal, so the negative integrator 40 will remain at its current cumulative level and the nulling operation will be complete.

A similar analysis may be made assuming a different phasing of the received jamming signals. For example, if it is assumed that the jamming signal source is exactly overhead and reaches the two antenna elements in phase, then $I_1$ and $I_2$ will be in phase, if it is further assumed that the electrical paths followed by these signals do not inject any phase differences. Initially, the correlation of the signal on line 34 and the $I_2$ input signal will be positive, and the negative integrator 40 will begin to ramp negatively. Thus the multiplier 42 will invert the $I_2$ signal, and the resulting signal will tend to cancel the $I_1$ signal when the two are added in summer 36.

Further, the analysis is not affected by the presence of additional auxiliary antennas and circuits. For each additional auxiliary circuit n, the output signal on line 34 is correlated with the $I_n$ and $Q_n$ components, and the resulting contribution is input to the same summer 36.

Nulling of the Q output signal is performed in a similar fashion, as indicated in FIG. 2B. The $Q_1$ input is summed in summer 60 with contributions derived from the auxiliary inputs. More specifically, the Q nulling circuit includes an $I_2$ weightign cirucit comprising a mixer 62, a negative integrator 64 and a multiplier 66, and a $Q_2$ weighting circuit comprising a mixer 68, a negative integrator 70 and a multiplier 72. A nulled Q output signal on line 74 is fed back and correlated with the $I_2$ and $Q_2$ input signals in the mixers 62 and 68, the result being accumulated in the negative integrators 64 and 70, and applied as a weighting factor in the multipliers 66 and 72. The resulting weighted values if $I_2$ and $Q_2$ are combined in a summer 76, and then input to the summer 60 to be combined with the $Q_1$ input signal.

The circuit of FIG. 2B generates the nulled Q signal on line 74 in much the same way that the nulled I signal is generated. Following the same example as FIG. 2A, initially the $Q_1$ input signal will be impressed on the output line 74, and fed back for correlation with the $I_2$ and $Q_2$ input signals. Initially, the $I_2$ and $Q_1$ signals will not correlate, being orthogonal. The negative integrator 64 will remain at zero and there will be no weighted contribution from the $I_2$ component. In mixer 68, the $Q_2$ signal correlates with the $Q_1$ signal, since one is the inverse of the other, and the negative integrator 70 begins to ramp positively. Thus a $Q_2$ component is input to the summer 76 and then to the summer 60, tending to cancel the $Q_1$ input and producing the desired nulled Q signal, as indicated by "/0" adjacent to line 74. When the nulled Q output is zero, negative integrator 70 continues to hold a positive value and continues to provide the necessary weighting factor to produce a nulling effect.

As described thus far, the circuit of FIGS. 2A and 2B will function to null any signals received by the antenna elements 17, including signals from the GPS satellites. The presently preferred embodiment of the invention uses ac coupling to permit the satellite signals to pass through the circuit without being subject to nulling. The circuit of FIG. 2A includes three coupling capacitors for this purpose. One capacitor 80 is connected in line 37, which feeds back the nulled I output for correlation with the $I_2$ and $Q_2$ inputs. Second and third capacitors 82 and 84 are connected in the $I_2$ and $Q_2$ input lines to the mixers 38 and 46, respectively. The jamming signal is composed of relatively high frequencies and couples easily through these capacitors. Because the data signals received from the satellite are basically dc (direct current) or of very low frequency, the capacitors present a very high impedance to these signals. Therefore, the I and Q data signals pass directly through the the summers 36 and 60 and onto the output lines 34 and 74, respectively, without unwanted compensation by the nulling circuitry.

Beam Steering When No Jamming Is Present

Figure 3A:
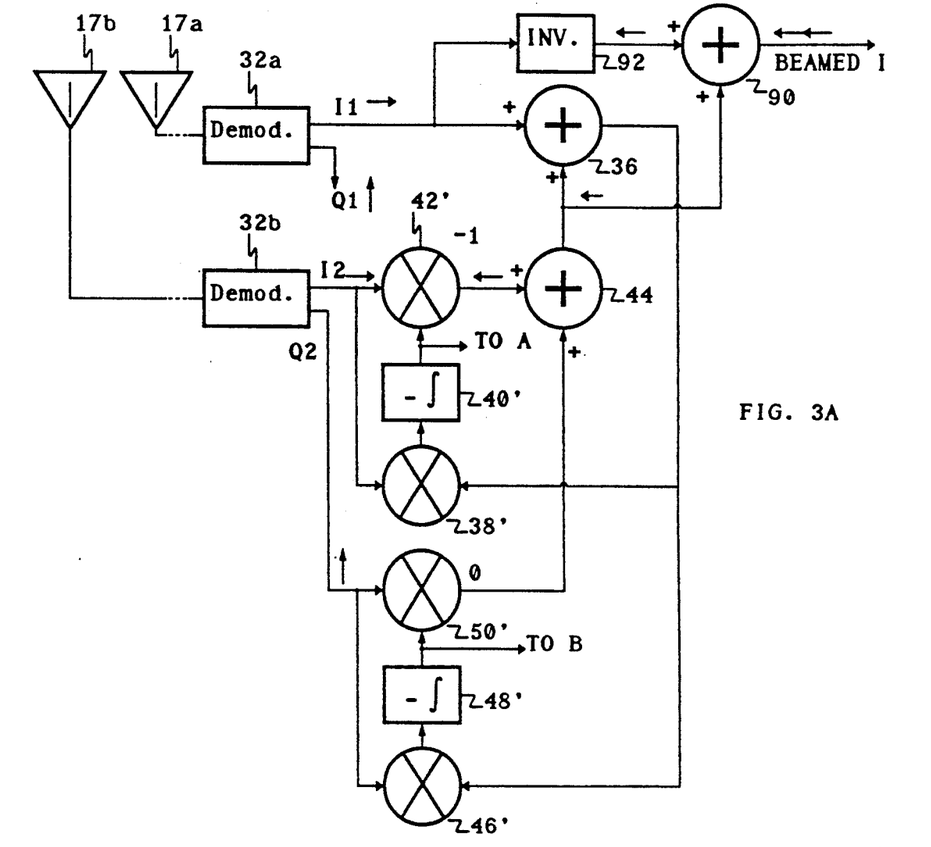
FIGS. 3A and 3B together constitute a simplified block diagram illustrating the closed-loop beam steering principle of the invention, as used when no jamming is present.

The dynamic weighting principles used in the nulling circuitry of FIGS. 2A and 2B can also be used to steer the antenna beam, as will now be explained with reference to FIGS. 3A and 3B. FIG. 3A includes many of the same components as FIG. 2A. For ease in comparing the two figures, primed and identical versions of the same reference numerals have been used where appropriate. Thus the FIG. 3A circuit includes summer 36 to which $I_1$ is input, and summer 44 for combining the outputs of two weighting circuits that determine the weights of the $I_2$ and $Q_2$ input signals. The principal difference, as contrasted with FIG. 2A, is that FIG. 3A does not include any capacitors for ac coupling. As described thus far, the circuit will perform nulling of an input data signal, and will therefore produce a zero output from the summer 36. Another important addition to the circuit is an additional summer 90 and an inverter 92. The inverter 92 inverts the $I_1$ input signal and connects it to the summer 90. The other input of the summer 90 is taken from the auxiliary input to summer 36. In effect, then, summer 90 has the same inputs as summer 36, but subtracts one input from the other instead of adding them. Therefore, instead of nulling the $I_1$ signal the summer 90 produces an enhanced signal on output line 94, referred to as a beamed I output signal.

Formation of a beamed Q signal makes use of an observable property of the nulling circuitry. When the circuitry is operating on a jamming signal and forms a null in the I output, there is an almost exact relationship between the weighting values in the circuits for processing the I and Q signals. Specifically, the $I_2$ weighting factor in the circuit for producing the nulled I output is the same as the $Q_2$ weighting factor in the circuit for producing the nulled Q output. Further, the $Q_2$ weighting factor in the circuit for producing the nulled I output is the inverse of the $I_2$ weighting factor in the circuit for producing the nulled Q output.

In symbolic form, if the factors for $I_2$ weighting and $Q_2$ weighting in the nulled I circuit are $i_{2I}$ and $q_{2I}$, respectively, and the factors for $I_2$ weighting and $Q_2$ weighting in the nulled Q circuit are $i_{2Q}$ and $q_{2Q}$, respectively, then:

$q_{2Q} = i_{2I}$ and
$i_{2Q} = q_{2I}$.

For brevity, the foregoing relationship will be referred to in this specification as cross-strapping with a change of sign.

Figure 3B:
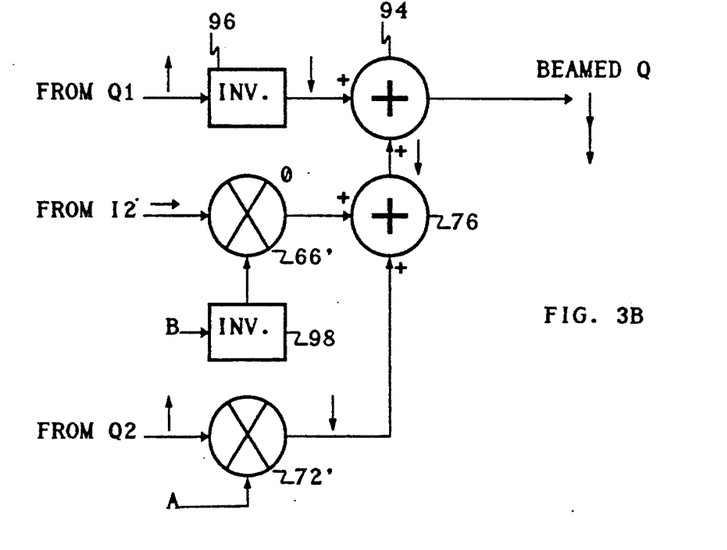

FIG. 3B shows how a beamed Q output signal is generated using the cross-strapping relationship. The circuit consists of summer 76, multipliers 66' and 72', an additional summer 94, and inverters 96 and 98. Using the cross-strapping principle, multiplier 66' receives as an input the inverted form of the signal produced by negative integrator 48' (FIG. 3A), supplied through connector B and inverter 98. Similarly, multiplier 72' receives an input from negative inverter 48', through connector B and without inversion. The multipliers 66' and 72' also have as inputs the demodulated $I_2$ and $Q_2$ signals, respectively, and produce outputs connected to summer 76, which combines the correctly weighted $I_2$ and $Q_2$ contributions. The output of summer 76 is coupled as an input to the additional summer 94, which also receives as an input the inverted form of the $Q_1$ input signal, through inverter 96. Summer 94 and inverter 96 generate the difference between the $Q_1$ input signal and the auxiliary components that are sufficient to null $Q_1$. Therefore, the output of summer 94 is a beamed Q signal. Forming a beamed Q signal int his manner is required because there is no satellite signal Q component present when the receiver phase lock loop is closed.

For the same reasons that the nulling circuit of FIGS. 2A and 2B produces an antenna pattern null that will automatically track the directional position of a jamming signal, the beam steering circuit of FIGS. 3A and 3B will automatically track the directional position of a moving satellite signal source. However, the circuit of FIGS. 3A and 3B will not operate properly in the presence of a jamming signal, since, if the jamming signal dominates, the antenna array will be effectively beamed toward the jamming signal instead of toward the desired signal source. A further modification is needed to permit beam steering in the presence of a jamming signal.

Beam Steering in the Presence of Jamming

Because of the nature of spread spectrum modulation techniques used in the GPS and other communication systems, a jamming signal may be spread over a wide range of frequencies and has the appearance of broadband noise. Some of the jamming signal noise is removed by the low-pass filters included in the demodulation process already described. However, when an effective jamming signal is present the signal output from the low-pass filters (which have a bandwidth of approximately 1 kHz) will typically have a negative signal to noise ratio (SNR), which means that the noise has a greater power than the signal.

Figure 4:
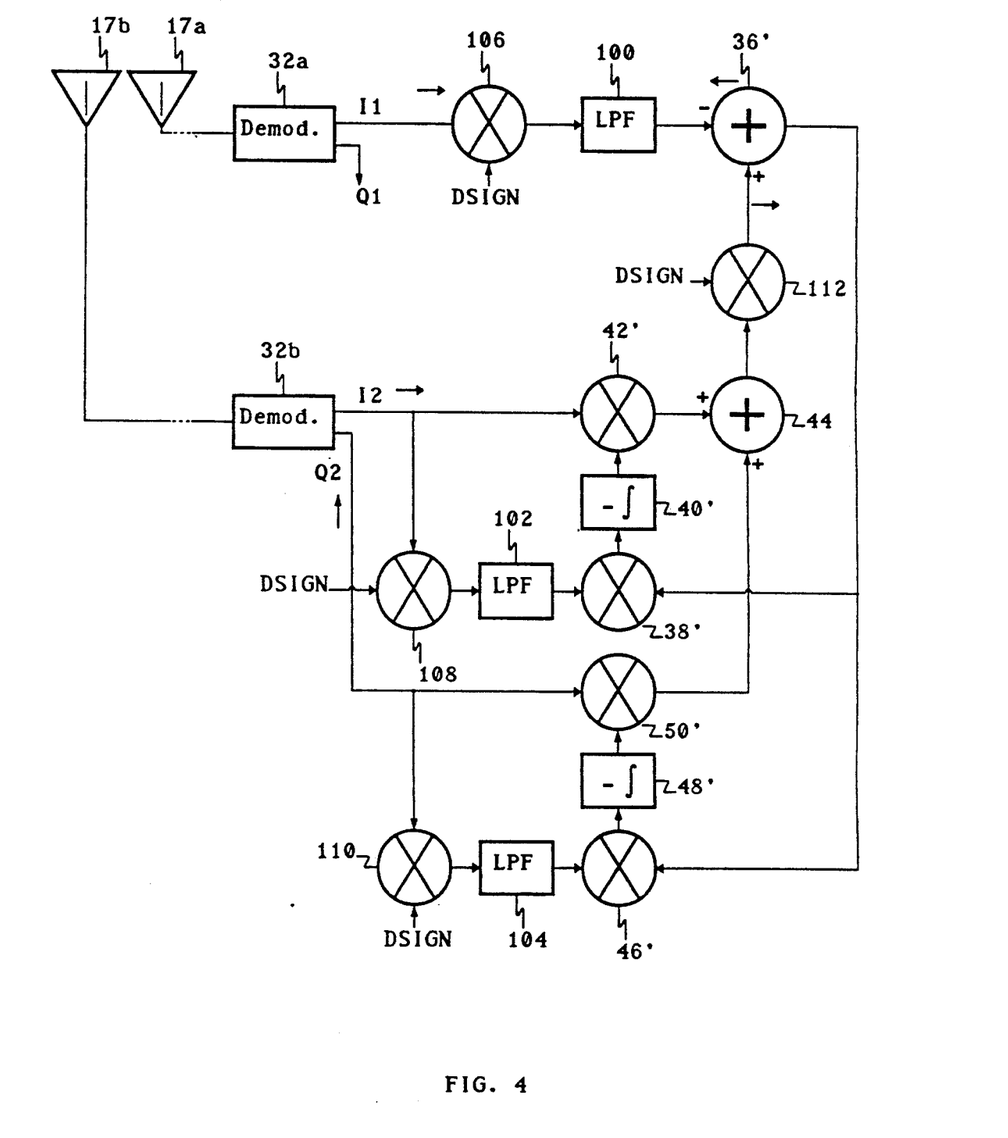
FIG. 4 is a simplified block diagram illustrating the closed-loop beam steering principle of the invention, as used when jamming is present.

The further improvement depicted in FIG. 4 requires the addition of additional low-pass filters 100, 102 and 104 having a bandwidth of only approximately 1 Hz. Filter 100 is connected in the $I_1$ input line to summer 36', and filters 102 and 104 are connected in the $I_2$ and $Q_2$ input lines to mixers 38' and 46', respectively. These filters remove practically all of the noise generated by the jamming signal, but permit the satellite information signals to pass. Because of the action of tracking loops in the tracking and detection circuitry 15 (FIG. 1), the satellite signals are basically dc signals that will be passed by the very narrow bandwidth low-pass filters 100, 102 and 104.

One additional step is needed to ensure that the satellite signals will pass through the filters. GPS signals are encoded with data at a low data rate of approximately 50 bits per second. As low as this data rate is, it still will not pass through the 1 Hz filters, so must be removed from the satellite signals to permit beam steering to operate. The step of removing the data is performed in mixers 106, 108, 110 and 112, the first three of which are connected in series with and immediately prior to the filters 100, 102 and 104, respectively. The fourth mixer 112 is connected between the output of summer 44 and the lower input of summer 36'. Each of these mixers has as its other input a signal referred as DSIGN, which is indicative of the sign of the data signal. The data being removed in the mixers is encoded on the baseband signals as a succession of sign reversals at the 50 Hz data rate. As will shortly be described, the sign of the I data signal can be conveniently derived and fed back as the DSIGN signal. Thus the effect of the mixers 106, 108, 110 and 112 is to remove the sign reversals in the input data signal, so that the signal will pass through the low-pass filters and beam steering will be operative.

Another difference between FIG. 4 and FIG. 3A is that the final summer 36' in FIG. 4 has its $I_1$ input inverted, as indicated by a minus sign. Initially, the input to summer 36' derived from the weighting circuits will be zero, and the $I_1$ signal will appear in inverted form at the output of summer 36'. In mixer 38' this inverted $I_1$ signal will be correlated negatively with the input $I_2$ signal having the opposite phase, and the negative integrator 40' will begin to ramp up positively. Thus multiplier 42' will leave the sign of the input $I_2$ signal unchanged, as indicated by the right-directed vector at the lower input of summer 36'. Therefore, the output of the summer 36' will converge on a zero value.

It will be appreciated that the inverter 92 and summer 90 of FIG. 3A have been omitted from FIG. 4 for simplicity, and that a corresponding circuit for forming a beamed Q signal in the presence of jamming has not been shown. However, a complete beam steering and nulling circuit will be discussed with reference to FIGS. 5A and 5B.

Combined Beam Steering and Nulling Circuit

Up to this point, the nulling and beam steering functions have been described separately, although FIG. 4 depicts beam steering in the presence of a jamming signal. On first consideration, it may appear to be impossible to implement both nulling and beam steering functions simultaneously since there is no Q signal component present due to the action of the receiver phase lock loop. The nulling operation is performed by automatically adjusting weighting circuits to form an antenna pattern in which a null is aligned with a jamming signal source. The beam steering operation has as its goal the adjustment of the antenna pattern to be aligned with a desired signal source, and thereby to enhance the signal to noise ratio (SNR) performance of the receiver. It would seem to be impossible to perform both functions at the same time.

Although the circuits shown in FIGS. 2–4 have included only two antenna elements (one primary element and one auxiliary element), it was noted earlier that a practical embodiment of the invention would include more antenna elements than two, and a corresponding number of processing circuits. In general, for an N-element antenna array, a system could be designed to null as many as $N-1$ jamming signals. A unique combination of the weight settings in the nulling circuit must be determined to null all $N-1$ jammers, and the system is then said to be fully constrained. If the number of jamming signals is $N-2$ or less, the system is said to be less than fully constrained and there is an infinite number of weight setting combinations that may selected to implement nulling of all the jamming signals. So long as the nulling system is less than fully constrained, beam steering is possible in addition to jammer nulling. A combined beam steering and jammer nulling circuit is shown in FIGS. 5A and 5B.

Figure 5A:
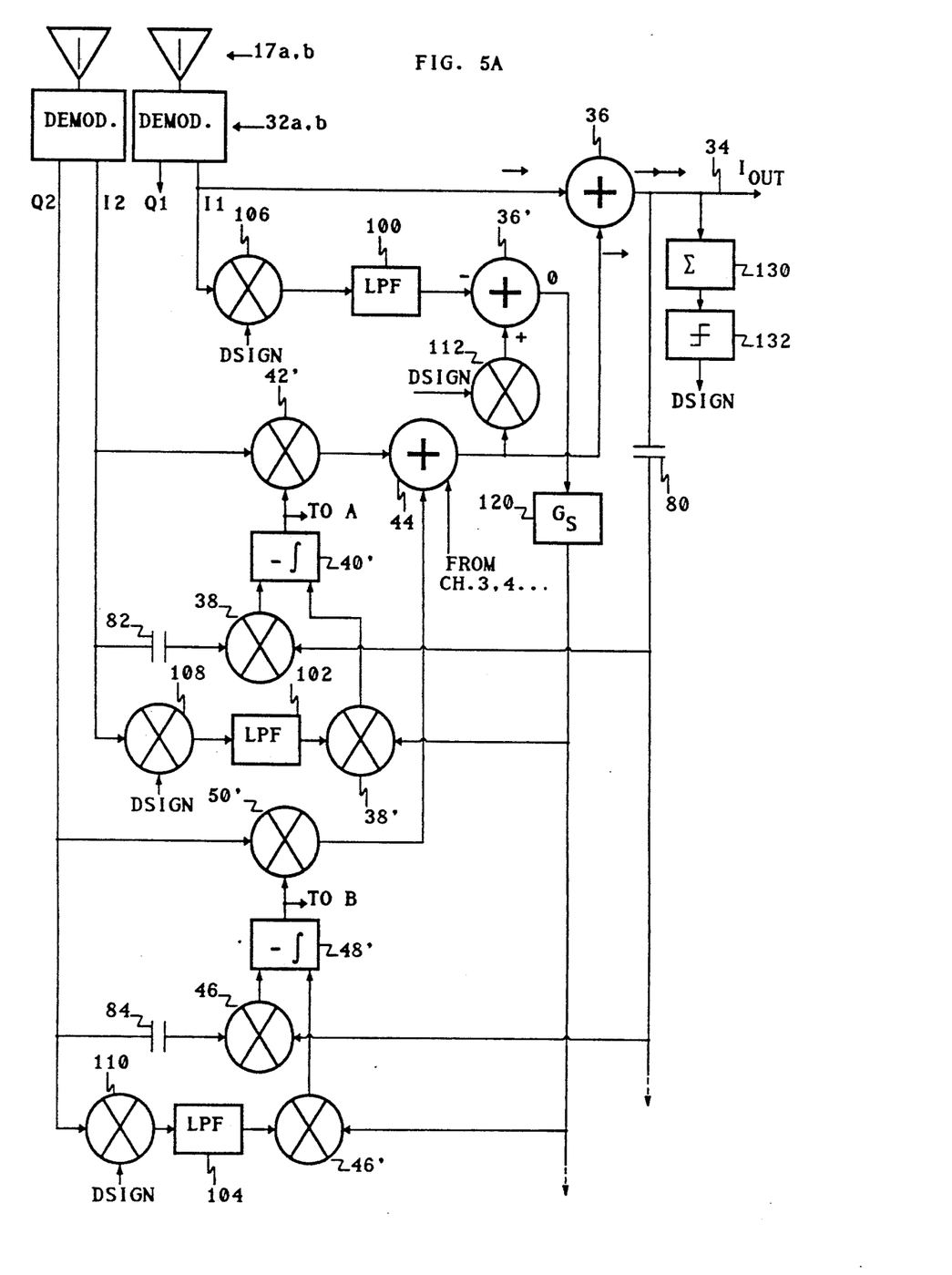
FIGS. 5A and 5B together constitute a simplified block diagram showing how the jammer nulling and closed-loop beam steering principles are combined in the preferred embodiment of the invention.
Figure 5B:
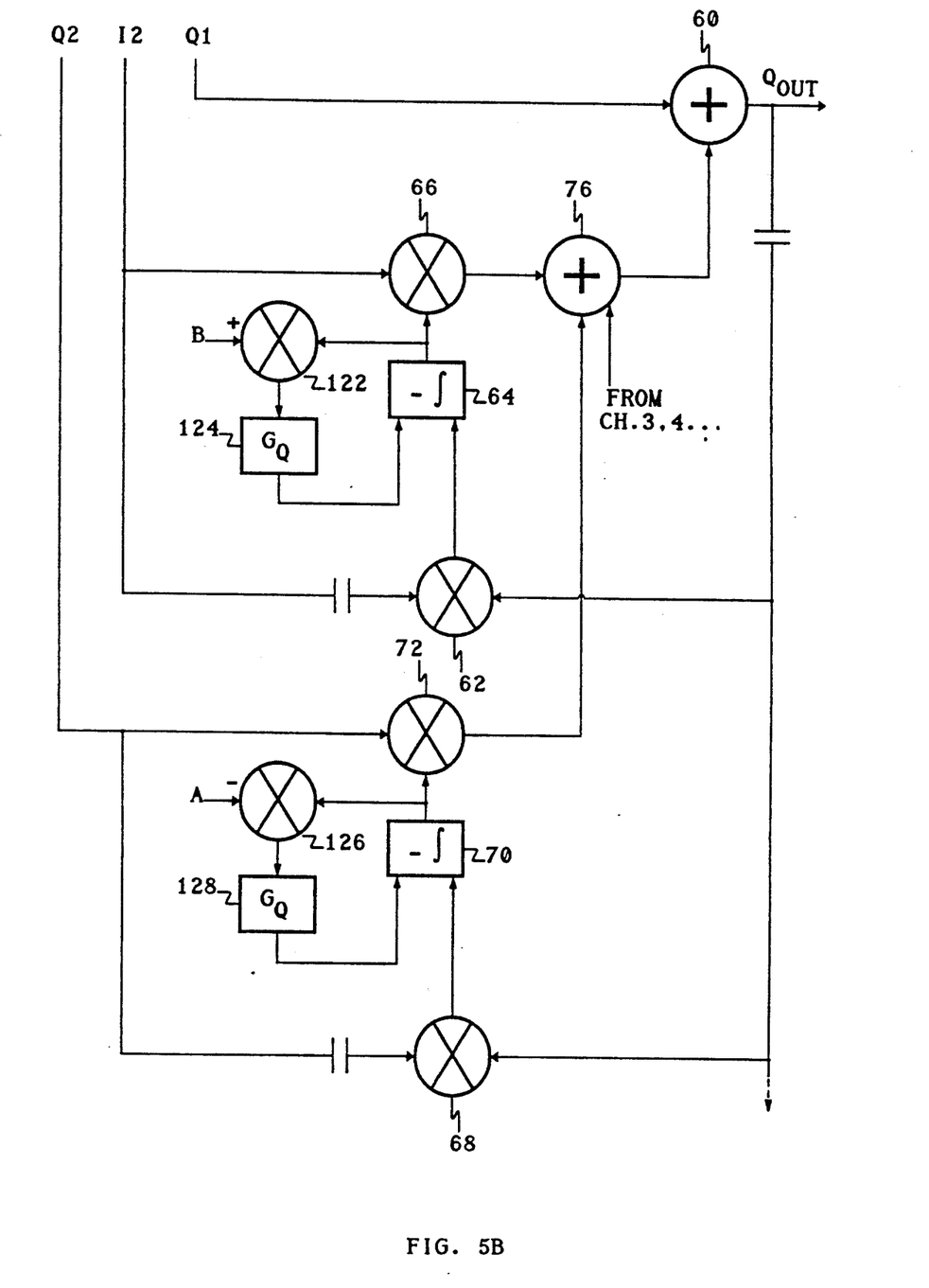

FIG. 5A is basically a combination of the features shown in FIGS. 2A and 4. The ac-coupled nulling circuit includes the summer 36, which combines the $I_1$ input signal with the output of summer 44, which in turn combines weighted $I_2$ and $Q_2$ inputs. Nulling is accomplished by feeding back the I output signal on line 34 to the mixers 38 and 46, which also receives input signals $I_2$ and $Q_2$. The outputs from these two mixers are connected to separate negative integrators 40' and 48', the outputs of which are connected to respective multipliers 42' and 50'. These multipliers apply appropriate weighting to the $I_2$ and $Q_2$ input signals, which are then combined in summer 44. The nulling function is performed exactly as described with reference to FIG. 2A. Nulling of the satellite information signals is precluded by the presence of capacitors 80, 82 and 84. Summer 44 has additional inputs from similar weighting circuits used to weight the signal contributions derived from third, fourth and additional antenna elements. The weighting circuits for determining these additional contributions has been omitted for clarity.

The beam steering circuitry of FIG. 5A includes the mixer 106 for removing data from the $I_1$ input signal, the low-pass filter 100, and the summer 36'. The two inputs to the summer 36' are an inverted $I_1$ input, derived from the mixer 106 and the filter 100, and the auxiliary input derived from the summer 44, through the additional mixer 112 used to remove data modulation. The output of mixer 36' is fed back to mixers 38' and 46' for correlation with the $I_2$ and $Q_2$ input signals.

Negative integrator 40' receives input from two sources: mixer 38, which correlates a nulling error signal from summer 36 with the $I_2$ input signal, and mixer 38', which correlates a beam steering error signal from summer 36' with the $I_2$ input signal. Likewise, negative integrator 48' receives inputs from mixer 46 and mixer 46'. The negative integrators develop weighting factors that are influenced by both the nulling function and the beam steering function of the circuit. The relative weight given to each function is controlled by a beam steering loop gain amplifier 120, having a gain factor $G_s$. In the presently preferred embodiment of the invention the value of $G_s$ is less than unity. A value of approximately 1/128 has proved satisfactory for most situations, but other gain factors may used to achieve desired performance characteristics. In any event, it appears that a relatively weak beam steering loop is all that is needed to "nudge" the weighting factors enough to move any spurious nulls away from the direction of a data signal.

The circuit for generating a Q output signal combining jammer nulling and beam steering principles when there is no Q signal component present int he Q channel output is shown in FIG. 5B. It includes the features of the nulling circuit of FIG. 2B, specifically the summer 60 for combining the $Q_1$ input signal and a combined weighting signal generated by summer 76. The nulled Q output signal is fed back, through ac coupling, to mixers 62 and 68, which correlate the nulled signal with $I_2$ and $Q_2$ inputs. Negative integrators 64 and 70 accumulated the outputs of the respective mixers 62 and 68, and generated weighting factors for applications to multipliers 66 and 72, respectively. $I_2$ and $Q_2$ input signals weighted by the multiplier outputs are combined in the summer 76, which also receives weighted input components from other similar weighting circuits that process signals from additional antenna elements.

Adjustment of the Q weighting factors is effected in part by cross-strapping with sign reversal from the I weighting factors of FIG. 5A, and in part by a control loop associated with each Q weighting circuit. In particular, the weighting circuit associated with the $I_2$ input further includes a multiplier 122 and loop gain amplifier 124. The multiplier 122 derives one input from the negative integrator 64 and the other, through connector B, from negative integrator 48' (FIG. 5A). The output of the multiplier is amplified by the gain amplifier 124 and then fed back into negative integrator 64 as a second input. A similar loop circuit is provided for nudging the $Q_2$ weighting factor, including a multiplier 126 and a loop gain amplifier 128. Following the cross strapping principle, this multiplier obtains one input, negated, from negative integrator 40', through connector A, and obtains its other input from negative integrator 70. The multiplier output is amplified by loop gain amplifier 128 and fed back into the negative integrator 70 as a second input.

The loop gain factor $G_Q$ provided by the amplifiers 122 and 128 is again preferably less than unity. A value of approximately ¼ is presently favored, to provide a relatively weak beam steering influence on the Q weighting factors.

As described earlier, the beam steering function of the invention depends principally on the use of a very low-pass filter (100, 102 and 104 in FIG. 5A). If, as in the case of GPS, there is a low-frequency data modulation on the received signal, this must be removed for beam steering purposes, to permit the information signal to pass through the filters. In the case of GPS, the data signal takes the form of a sign modulation at 50 bits per second. The signal DSIGN is used to remove this modulation in mixers 106, 108, 110 and 112. The DSIGN signal is easy to derive from the I output signal on line 34, and requires only a summing circuit 130 and a limiter 132. The summing circuit integrates the incoming signal over 20-millisecond intervals, under control of a conventionally derived data-rate clocking signal (not shown), and the limiter produces a positive or negative output signal indicative of the sign of the information signal. This is the DSIGN signal used to strip data from the information signal for purposes of beam steering.

Performance of the apparatus of the invention is obviously very much dependent on the degree to which the system is constrained by the presence of jamming signals. So long as the system is not completely constrained, i.e. with fewer than N−1 jammers present, the beam steering loop will operate to "nudge" the weighting factors sufficiently to move any spurious nulls away from the direction of incoming signals. This avoids the cycle-slipping problem alluded to earlier, and at the same time provides a substantial improvement in SNR performance. Once the system becomes constrained by the presence of N−1 jammers, its operation reverts to that of a pure jammer nulling circuit, and spurious nulls may affect the receiver performance.

It will be appreciated from the foregoing that the present invention represents a significant advance in the field of signal processing receivers subject to interference from jamming signals. In particular, the invention provides a technique for nulling out a limited number of jamming signals while at the same time steering the antenna array to avoid the alignment of a spurious null in the antenna pattern with the direction of a signal of interest. It will also be appreciated that, although an embodiment of the invention has been described in detail for purposes of illustration, various modifications may be made without departing from the spirit and scope of the invention. Accordingly, the invention is not to be limited except as by the appended claims.

I claim:

1. Signal processing receiver apparatus, comprising:
   demodulator means for demodulating a plurality of modulated signals received at a corresponding plurality of antenna array elements, to produce a primary information signal and one or more related auxiliary information signals, all of the information signals containing an interference signal;
   weighting means for operating on the one or more auxiliary information signals to produce a corresponding number of intermediate signals; and
   summing means for combining the primary information signal and the intermediate signals to produce a sum signal in which the interference signal is substantially nulled out;
   wherein the weighting means includes means for adjusting weighting factors applied to the auxiliary information signals, to steer a composite beam formed by the antenna array elements to a direction that enhances reception of the modulated signals, without detracting significantly from nulling of the interference signal;
   and wherein the weighting means and the summing means function together to produce simultaneous nulling of the interference signal and steering of the composite beam;

and wherein the means for adjusting the weighting factors to enhance reception of the modulated signals includes adjustable gain means, to ensure that beam steering correction signals do not have an adverse effect on nulling out the interference signal;

and wherein the weighting means includes
means for correlating the sum signal with each of the auxiliary information signals, to produce a corresponding number of product signals,
means for integrating the product signals to product a corresponding number of weighting factors, and
means for multiplying the weighting factors by the corresponding auxiliary information signals to produce the intermediate signals for summing with the primary information signal;

and further comprising:
means for removing any time-varying data components from the demodulated primary information signal, to leave only an essentially non-varying primary information signal;
low-pass filter means, for removing from the demodulated primary information signal any components due to the interference signal; and
additional summing means, for combining the primary signal, free of the interference signal, with the intermediate signals, to produce a beam steering error signal;
and wherein the means for adjusting the weighting factors includes additional correlation means, for correlating the beam steering error signal with each of the auxiliary information signals to produce a second set of product signals, and means for combining the two sets of product signals to product a signal set of weighting factors.

2. Signal processing receiver apparatus as defined in claim 1, wherein:
the adjustable gain means includes means for multiplying the beam steering error signal by a gain factor less than unity, for coupling to the additional correlation means, whereby adjustment of the weighting factors to perform a beam steering function is given less significance than selection of the factors for nulling performance.

3. A signal processing method, comprising the steps of;
receiving modulated signals and at least one interference signal in an array of antenna elements;
demodulating a plurality of modulated signals received by the antenna elements, to produce a primary information signal and one or more related auxiliary information signals, all of the information signals containing an interference signal;
weighing the one or more auxiliary information signals to produce one or more intermediate signals; and
summing together the primary information signal and the one or more intermediate signals to produce a sum signal in which the interference signal is substantially nulled out;
and wherein the step of weighting the auxiliary information signals includes generating a set of weighting factors that will result in nulling of the interference signals, and adjusting the weighting factors to avoid any unwanted nulling of one or more of the information signals;
and wherein the steps of weighting and summing are performed in such a way as to effect simultaneous nulling of the interference signals and beam steering to avoid any unwanted nulling of the information signals;
and wherein the step of adjusting the weighting factors includes applying a gain factor to beam steering correction signals, the gain factor being selected to ensure that beam steering correction signals do not have an adverse effect on nulling out the interference signal;
wherein the step of weighting the auxiliary information signals includes
correlating the sum signal with one or more auxiliary information signals to produce a set of product signal,
integrating each of the set of product signals to produce a set of the weighting factors, and
multiplying the one or more auxiliary information signals by corresponding weighting factors to obtain the intermediate signals;
wherein the step of adjusting the weighting factors includes:
deriving a modified primary information signal that is substantially free of interference and data modulation;
combining the modified primary information signal with the intermediate signals, to produce a beam steering error signal indicative of the degree to a composite antenna beam is being steered toward a source of the information signals;
correlating a selected fraction of the beam steering error signals with the one or more auxiliary information signals to produce a second set of product signals; and
combining the two sets of product signals to produce a single set of weighting factors that results in nulling of beam to avoid alignment of a spurious null with a source of the information signals.

4. Signal processing receiver apparatus, comprising:
demodulator means for demodulating a plurality of modulated signals received at a corresponding plurality of antenna array elements, to produce a primary information signal and one or more related auxiliary information signals, all of the information signals containing an interference signal;
interference nulling means for combining the primary information signal with weighted components derived from the auxiliary information signals, in such a manner that an output information signal is produced substantially free of interference components;
beam steering means for combining the primary information signal with weighted components derived from the auxiliary information signals, in such a manner that a composite antenna beam is steered to maximize the signal power of the received information signals; and
means for combining the interference nulling means and the beam steering means to provide for simultaneous interference nulling and beam steering, wherein the means for combining includes amplifier means with a gain selected to give priority to the interference nulling means, whereby the antenna array produces a pattern that has a null directed to at least one interference signal source and has no spurious nulls aligned with an information signal source;

and wherein:

the interference nulling means and the beam steering means both employ a common weighting means for operating on the one or more auxiliary information signals to produce a corresponding number of intermediate signals;

the interference nulling means has a first summing means for combining the primary information signal and the intermediate signals to produce a first sum signal in which the interference signal is substantially nulled out;

the beam steering means has a second summing means for combining the primary information signal, filtered to remove interference signals, to produce a second sum signal indicative of beam steering error;

the weighting means includes means for correlating the auxiliary information signals with the first sum signal to produce a first set of product signals, and means for correlating the auxiliary information signals with a selected fraction of the second sum signal to produce a second set of product signals; and the means for combining the interference nulling means and the beam steering means includes integrator means for combining the first ad second sets of products to produce a single set of weighting factors for application to the auxiliary information signals.

5. Signal processing receiver apparatus comprising:

demodulator means for demodulating a plurality of modulated signals received at a corresponding plurality of antenna array elements, to produce a primary information signal and one or more related auxiliary information signals, all of the information signals containing an interference signal;

interference nulling means for combining the primary information signal with weighted components derived from the auxiliary information signals, in such a manner that an output information signal is produced substantially free of interference components;

beam steering means for combining the primary information signal with weighted components derived from the auxiliary information signals, in such a manner that a composite antenna beam is steered to maximize the signal power of the received information signals; and means for combining the interference nulling means and the mean steering means to provide for simultaneous interference nulling and beam steering, wherein the means for combining includes amplifier means with a gain selected to give priority to the interference nulling means, whereby the antenna array produces a pattern that has a null directed to at least one interference signal source and has no spurious nulls aligned with an information signal source;

and wherein:

the interference nulling means includes means for distinguishing between interference signals and information signals, such that the information signals are not subject to nulling.

6. Signal processing receiver apparatus as defined in claim 5, wherein:

the means for distinguishing between interference signals and information signals includes one or more capacitive components that present a low impedance path to high-frequency interference signals and a high impedance path to low-frequency information signals.

7. Signal processing receiver apparatus, comprising:

demodulator means for demodulating a plurality of modulated signals received at a corresponding plurality of antenna array elements, to produce a primary information signal and one or more related auxiliary information signals, all of the information signals containing an interference signal;

interference nulling means for combining the primary information signal with weighted components derived from the auxiliary information signals, in such a manner that an output information signal is produced substantially free of interference components;

beam steering means for combining the primary information signal with weighted components derived from the auxiliary information signals, in such a manner that a composite antenna beam is steered to maximize the signal power of the received information signals; and means for combining the interference nulling means and the beam steering means to provide for simultaneous interference nulling and beam steering, wherein the means for combining includes amplifier means with a gain selected to give priority to the interference nulling means, whereby the antenna array produces a pattern that has a null directed to at least one interference signal source and has no spurious nulls aligned with an information signal source;

and wherein:

the beam steering means includes means for low-pass filtering the primary information signal to remove substantially all components of the interference signal, and means for removing low-frequency data signals encoded onto the primary information signal, to render the information signal able to pass through the means for low-pass filtering.

8. Signal processing receiver apparatus, comprising:

demodulator means for demodulating a plurality of modulated signals received at a corresponding plurality of antenna array elements, to produce a primary information signal and one or more related auxiliary information signals, all of the information signals containing an interference signal;

weighting means for operating on the one or more auxiliary information signals to produce a corresponding number of intermediate signals; and summing means for combining the primary information signal and the intermediate signals to produce a sum signal in which the interference signal is substantially nulled out;

wherein the weighting means includes means for adjusting weighting factors applied to the auxiliary information signals, to steer a composite beam formed by the antenna array elements to a direction that enhances reception of the modulated signals, without detracting significantly from nulling of the interference signal, and in a phase lock condition without the presence of a received quadrature signal component;

and wherein the weighting means and the summing means function together to produce simultaneous nulling of the interference signal and steering of the composite beam, in the absence of a received quadrature signal components;

and wherein the means for adjusting the weighting factors to enhance reception of the modulated signals includes adjustable gain means, to ensure that beam steering correction signals do not have an adverse effect on nulling out the interference signal.

9. Signal processing receiver apparatus as defined in claim 8, wherein the means for adjusting weighting factors applied to the auxiliary information signals includes;

means for adjusting a first set of weighting factors used to generate a beamed in-phase (I) signal component; and means for adjusting a second set of weighting factors used to generate a beamed quadrature (Q) signal component;

and wherein the second set of weighting factors are derived from the first set by cross-strapping with a change of sign.

10. A signal processing method, comprising the steps of:

receiving modulate signals and at least one interference signal in an array of antenna elements;

demodulating a plurality of modulated signals received by the antenna elements, to produce a primary information signal and one or more related auxiliary information signals, all of the information signals contiangn an interference signal;

weighting the one or more auxiliary information signals to produce one or more intermediate signals; and summing together the primary information signal and the one or more intermediate signals to produce a sum signal in which the interference signal is substantially nulled out;

and wherein the step of weighting the auxiliary information signals includes generating weighting factors that will result in nulling of the interference signal, and adjusting the weighting factors to avoid any unwanted nulling of one or more of the information signals;

and wherein the steps of weighing and summing are performed in such a way as to effect simultaneous nulling of the interference signal and beam steering to avoid any unwanted nulling of the information signals, and in a phase lock condition int eh absence of a received quadrature signal component;

and wherein the step of adjusting the weighting factors includes applying a gain factor to beam steering correction signals, the gain factor being selected to ensure that beam steering correction signals do not have an adverse effect on nulling out the interference signal.

11. A signal processing method as defined in claim 10, wherein the step of adjusting the weighting factors includes:

adjusting a first set of weighting factors used to generate a beamed in-phase (I) signal component; and adjusting a second set of weighting factors used to generate a beamed quadrature (Q) signal component;

and wherein the second set of weighting factors are derived from the first set by cross-strapping with a change of sign.

* * * * *